(12) United States Patent
Ishikawa et al.

(10) Patent No.: US 8,418,367 B2
(45) Date of Patent: Apr. 16, 2013

(54) METHOD OF MANUFACTURING A ROLLING BEARING UNIT FOR SUPPORTING A WHEEL

(75) Inventors: Hiroaki Ishikawa, Kanagawa (JP); Yasunori Suzuki, Kanagawa (JP); Narihito Otake, Kanagawa (JP); Tetsu Takehara, Kanagawa (JP); Kiyotaka Hirata, Kanagawa (JP); Shouji Horike, Kanagawa (JP); Tetsuo Wakabayashi, Kanagawa (JP)

(73) Assignee: NSK Ltd., Tokyo (JP)

( * ) Notice: Subject to any disclaimer, the term of this patent is extended or adjusted under 35 U.S.C. 154(b) by 1284 days.

(21) Appl. No.: 12/066,019

(22) PCT Filed: Sep. 5, 2006

(86) PCT No.: PCT/JP2006/317553
§ 371 (c)(1),
(2), (4) Date: Jun. 9, 2008

(87) PCT Pub. No.: WO2007/029700
PCT Pub. Date: Mar. 15, 2007

(65) Prior Publication Data
US 2009/0103847 A1    Apr. 23, 2009

(30) Foreign Application Priority Data

Sep. 6, 2005   (JP) ................................. 2005-257351
Sep. 6, 2005   (JP) ................................. 2005-257352
Aug. 28, 2006  (JP) ................................. 2006-229992

(51) Int. Cl.
*B21K 1/40*     (2006.01)
*B23B 5/02*     (2006.01)
*F16C 13/00*    (2006.01)
*B60B 27/00*    (2006.01)

(52) U.S. Cl.
USPC ................ 29/894.362; 29/894.3; 29/898.063; 29/898.066; 29/898.09; 29/557; 29/445; 82/1.11; 82/112; 384/544; 301/105.1

(58) Field of Classification Search .................... 29/898, 29/898.04, 898.07–898.09, 894, 894.01, 29/894.011, 894.012, 894.3, 894.362, 557, 29/897.2, 445, 898.06–898.066, 894.36, 29/894.361; 188/73.1; 280/124.146–124.148, 280/124.154; 301/105.1, 6.8; 384/544, 589; 81/1.11, 112; 451/51, 52, 63, 625
See application file for complete search history.

(56) References Cited

U.S. PATENT DOCUMENTS 6,158,124 A    12/2000   Austin
(Continued)

FOREIGN PATENT DOCUMENTS

EP    0 816 128 A2    1/1998
(Continued)

OTHER PUBLICATIONS

Supplementary European Search Report (with search opinion) dated Feb. 10, 2011 in European Patent Application No. 06 78 3191.

*Primary Examiner* — Sarang Afzali
(74) *Attorney, Agent, or Firm* — Miles & Stockbridge P.C.

(57) ABSTRACT

To realize a manufacturing method for a wheel-supporting rolling bearing unit that can establish sufficient parallelism between a rotating side installation surface 14 for fastening to and supporting a disk of a disk brake and a stationary side installation surface 15 for fastening a caliper or support, in the present invention, while rotating a hub 2 comprising the rotating side installation surface 14 with respect to an outer race comprising the stationary side installation surface, a finishing process such as turning is performed on the rotating side installation surface 14 or both side surfaces in the axial direction of the disk which is fastened and supported to and by the rotating side installation surface 14, with the stationary side installation surface 15 as a reference surface.

7 Claims, 11 Drawing Sheets

U.S. PATENT DOCUMENTS

| | | | |
|---|---|---|---|
| 6,796,029 B2 * | 9/2004 | Mazur et al. | 29/894.361 |
| 6,829,825 B1 * | 12/2004 | Bowman et al. | 29/894.32 |
| 2002/0066185 A1 * | 6/2002 | Loustanau et al. | 29/898.06 |
| 2003/0165280 A1 | 9/2003 | Hofmann et al. | |

FOREIGN PATENT DOCUMENTS

| | | |
|---|---|---|
| EP | 1 552 964 A1 | 7/2005 |
| JP | 2001-180209 A | 7/2001 |
| JP | 2001-259902 A | 9/2001 |
| JP | 2003-514680 T | 4/2003 |
| JP | 2003-214443 A | 7/2003 |
| JP | 2004-82320 A | 3/2004 |
| JP | 2004-225752 A | 8/2004 |
| JP | 2004-257415 A | 9/2004 |
| JP | 2005-003176 A | 1/2005 |
| JP | 2005-046994 A | 2/2005 |
| JP | 2005-195061 A | 7/2005 |
| WO | WO 00/74883 A1 | 12/2000 |
| WO | WO 01/38025 A1 | 5/2001 |

* cited by examiner

METHOD OF MANUFACTURING A ROLLING BEARING UNIT FOR SUPPORTING A WHEEL

BACKGROUND OF THE INVENTION

This invention relates to a rolling bearing unit that supports an automobile wheel and a disk of a disk brake so that they rotate freely with respect to the suspension, as well as supports a caliper or support of the disk brake, and relates to the manufacturing method thereof.

The wheel of an automobile, and the disk of a disk brake are supported by a rolling bearing unit for wheel support on the knuckle of a suspension so that they can rotate freely. On the other hand, the caliper or support of the disk brake is generally fastened to and supported by the knuckle. However, from the aspect of improving assemblibility of the caliper or support in an automobile or improving the handleability of the caliper or support, in recent years, fastening and supporting the caliper or support to a member on the stationary side of the wheel-supporting rolling bearing unit has been considered. For example, construction in which a flange for fastening to and supporting the caliper or support is located on the outer peripheral surface of the outer race, which is the stationary side member of the wheel-supporting rolling bearing unit, is disclosed in US Patent Application Publication No. 2003/0165280.

FIG. 16 and FIG. 17 show an example of a wheel-supporting rolling bearing unit having a flange on the outer peripheral surface of the stationary side member for fastening to and supporting the caliper or support that differs from the construction that is publicly disclosed in US Patent Application Publication No. 2003/0165280, and was previously considered by the inventors. This wheel-supporting rolling bearing unit comprises: an outer race 1 that is a stationary side member, a hub 2 that is a rotating side member, and a plurality of balls 3 that are rolling bodies. Of these, the outer race 1 has a double row of outer raceways 4a, 4b formed around an inner peripheral surface thereof. Also, on a section toward the inside end of the outer peripheral surface, there is a connection flange 5 for connecting and fastening to the knuckle (not shown) and similarly, in a section in the circumferential direction of the middle section (section adjacent on the outside in the axial direction of the connection flange 5) there is a stationary side support flange 6 for supporting and fastening to the caliper or support (not shown). Here, 'inside' in the axial direction refers to the center side in the width direction of the vehicle when assembled in the vehicle, and is the right side in FIGS. 8, 12, and 16 to 18, is the bottom side in FIGS. 1 to 7, 9 to 11, 13 and 15, and is the top side in FIG. 14. On the other hand, the 'outside' in the axial direction, refers to the outside in the width direction of the vehicle, and is the left side in FIGS. 8, 12, and 16 to 18, the top side in FIGS. 1 to 7, 9 to 11, 13 and 15, and the bottom side in FIG. 14.

Also, the hub 2 comprises a main hub body 7 and an inner race 8 that is fitted and fastened onto the inside end of the main hub body 7. This kind of hub 2 has a rotating side support flange 10 located on the outer peripheral surface of the section toward the outside end thereof for fastening to and supporting the wheel and disk 9 (see FIG. 18 to be described later), and a double row of inner raceways 11a, 11b that are similarly located around the middle section and inside end section. Of these, the rotating side support flange 10 and the inner raceway 11a on the outside are formed around the outer peripheral surface of the main hub body 7, and the inner raceway 11b on the inside is formed around the outer peripheral surface of the inner race 8. Moreover, press-fit through holes 12 that penetrate through in the axial direction are formed at a plurality of locations in the circumferential direction of the rotating side support flange 10, and studs 13 are press-fitted and fastened to the inside of each of these press-fit through holes 12. Also, a plurality of balls 3 are located between each of the outer raceways 4a, 4b and each of the inner raceways 11a, 11b so that they can roll freely. In the example shown in the figures, balls 3 are used as the rolling bodies, however, in the case of a rolling bearing unit for a heavy automobile, tapered rollers may be used as the rolling bodies.

When the wheel-supporting rolling bearing unit constructed as described above is installed in an automobile, the inside surface of the connection flange 5 is brought into contact with the side surface of the knuckle, and this connection flange 5 is connected and fastened to the knuckle. Also, as shown in FIG. 18, the section toward the inner radial side on the surface of one side of the disk 9 is brought into contact with the rotating side installation surface 14, which is the outside surface of the rotating side support flange 10, and the disk 9 and wheel are fastened to and supported by this rotating side support flange 10 by a plurality of studs 13 and nuts (not shown). Moreover, in the case where the disk brake is a floating caliper disk brake, the support that supports the caliper is brought into contact with and installed on the stationary side installation surface 15, which is the outside surface of the stationary side support flange 6, and in the case where the disk brake is an opposed piston disk brake, the caliper is brought into contact with and installed on the stationary side installation surface 15. Also, the disk brake is formed by combining the disk 9 and caliper. When braking, a pair of pads that are installed on the support or caliper on both sides of the disk press against both side surfaces of the disk. The wheel-supporting rolling bearing unit that is shown in the figures is for driven wheels (rear wheels in a FF vehicle, and front wheels in a FR vehicle), however, in the case of a wheel-supporting rolling bearing unit for drive wheels (front wheels in a FF vehicle, rear wheels in a FR vehicle, and all wheels in a 4WD vehicle), a spline hole is formed in the center section of the hub. When installing the rolling bearing unit in the automobile, the spline shaft (drive shaft) of a constant velocity joint is connected by a spline connection with the spline hole.

However, when manufacturing a wheel-supporting rolling bearing unit that has a stationary side support flange 6 as described above, and that is used in combination with the disk 9, conventionally, the finishing process of the stationary side installation surface 15 and the finishing process of the rotating side installation surface 14 were performed separately and independently (there was no direct relationship between the processes). The same is true for the finishing process of the stationary side installation surface 15 and finishing process of the pair of parallel braking friction surfaces 16, which are both of the side surfaces of the outer half in the radial direction of the disk 9. However, by performing the finishing process of the stationary side installation surface 15 and the finishing process of the rotating side installation surface 14 or both braking friction surfaces 16 separately and independently, even though the surface precision (for example, flatness, or squareness with respect to the center axis) of these surfaces 14, 15 and 16 can be adequately maintained, there is a possibility that after completion it will not be possible to adequately maintain the relative precision (for example, parallelism) between these surfaces 14, 15, 16.

For example, when the parallelism between the rotating side and stationary side installation surfaces 14, 15, or the parallelism between the stationary installation surface 15 and both braking friction surfaces 16 is not adequately maintained, it is not possible to obtain a good (desired) positional relationship between both braking friction surfaces 16 and the support or caliper that is installed on the stationary side installation surface 15. As a result, the contact state between both braking friction surfaces 16 and the aforementioned pads becomes nonuniform. Also, as this nonuniform level becomes large, it becomes easy for vibration with noise, or in other words judder, occurring during braking. Therefore, in order to suppress the occurrence of this kind of judder, a manufacturing method is preferred in which it is possible to adequately maintain the parallelism between the rotating side installation surface and stationary side installation surface 14, 15, and between the stationary side installation surface 15 and both braking friction surfaces 16.

Other prior art that is related to the present invention is the manufacturing method for a wheel-supporting rolling bearing unit that is disclosed in Japanese Translation Publication of PCT International Application No. 2003-514680. The manufacturing method disclosed in this publication is a method in which after assembling the stationary side member, rotating side member and the plurality of rolling bodies of the wheel-supporting rolling bearing unit, a turning process, which is a flat surface processing, is performed on the rotating side installation surface, which is the surface on which the disk is installed, while rotating the rotating side members with respect to the stationary side members. By using this kind of method, it is possible to suppress run out in the axial direction of the rotating side installation surface when rotating, so it is possible to suppress the occurrence of judder due to run out in the axial direction of the disk that is installed on this rotating side installation surface. However, in this publication, a wheel-supporting rolling bearing unit comprising a stationary side support flange for fastening to and supporting a caliper or support is not disclosed as the object of the invention. In other words, the object of the manufacturing method that is disclosed in this publication is not the manufacture of a wheel-supporting rolling bearing that comprises the aforementioned stationary side support flange, and it is not the intent of the this manufacturing method to maintain the parallelism between the stationary side installation surface, which is the side surface of this stationary side support flange, and the rotating side installation surface or the braking friction surfaces of the disk.

Also, in U.S. Pat. No. 6,158,124, a manufacturing method is disclosed for a wheel-supporting rolling bearing unit in which after assembling the stationary side member, rotating side member, plurality of rolling bodies and the disk of the wheel-supporting rolling bearing unit, a turning process, or in other words, a flat surface processing is performed on the pair of braking friction surfaces of the disk while rotating the rotating side members and disk with respect to the stationary side members. By employing this kind of manufacturing method, it is possible to suppress run out in the axial direction during rotation of the braking friction surfaces, and thus it is possible to suppress the occurrence of judder due to run out in the axial direction. However, even in U.S. Pat. No. 6,158,124, the manufacture of a wheel-supporting rolling bearing unit that comprises a stationary side support flange for fastening to and supporting the caliper or support is not disclosed as the object of manufacturing. In other words, as in the case of the manufacturing method disclosed in Japanese Translation Publication of PCT International Application No. 2003-514680, the object of the manufacturing method that is disclosed in U.S. Pat. No. 6,158,124 is not the manufacture of a wheel-supporting rolling bearing that comprises the aforementioned stationary side support flange, and it is not the intent of the this manufacturing method to maintain the parallelism between the installation surface, which is the side surface of this stationary side support flange, and the pair of braking friction surfaces.

SUMMARY OF THE INVENTION

Taking the aforementioned problems into consideration, the object of present invention is to provide a wheel-supporting rolling bearing unit and manufacturing thereof that in order to suppress the occurrence of judder during braking, is capable of adequately maintaining the parallelism between the stationary side installation surface on which the support or caliper is installed, and the rotating side installation surface on which the disk is installed or the braking friction surfaces of the disk.

The wheel-supporting rolling bearing unit that is the object of this invention comprises a stationary side member, a rotating side member and a plurality of rolling bodies.

The stationary side member has a stationary side raceway formed around a stationary side peripheral surface thereof, and a stationary side support flange for fastening to and supporting a caliper or support of a disk brake formed around an outer peripheral surface thereof, and during operation does not rotate when connected and fastened to a suspension.

Also, the rotating side member has a rotating side raceway formed around a rotating side peripheral surface, and during operation rotates together with a wheel and a disk of the disk brake. Also, around the outer peripheral surface of the rotating side member there is a rotating section that comprises a rotating side circular surface having a surface that is perpendicular with respect to the center axis of rotation of the rotating side member.

Moreover, the rolling bodies are located between the stationary side raceway and the rotating side raceway so that they can roll freely.

Furthermore, at least part of any one of the both side surfaces of the stationary side support flange functions as a stationary side installation surface for installing the caliper or support in use.

In the manufacturing method for a wheel-supporting rolling bearing unit of this invention, first the stationary side member, rotating side member and the rolling bodies are assembled together. After that, while the member comprising one of the surfaces, either the rotating side circular surface or stationary side installation surface, is rotated with respect to the member comprising the other surface, a flat surface processing is performed at the same time on the other surface, using the one surface as a reference surface. As a result, the parallelism of the other surface with respect to the one surface is improved.

In the case of implementing the manufacturing method for a wheel-supporting rolling bearing unit of this invention as described above, the aforementioned rotating section may be specifically a rotating side support flange for fastening to and supporting the wheel and disk of a disk brake, and which is formed on the outer peripheral surface of the rotating side member. In this case, the rotating side circular surface is at least part of any one of the side surfaces of the rotating side support flange and is a rotating side installation surface for installing the disk in use. Also, using one of the installation surfaces, either the rotating side installation surface or stationary side installation surface as a reference surface, a flat surface processing is performed on the other installation surface, whereby the parallelism of the other installation surface with respect to the one installation surface is improved.

Moreover, in the case of implementing this invention, it is preferred that after a flat surface processing has been performed on the other installation surface, while the member comprising the one installation surface is rotated with respect to the member comprising the other surface, the flat surface processing be performed at the same time on the one installation surface using the other installation surface as a reference surface. As a result, the parallelism of the one installation surface with respect to the other installation surface is improved.

Also, in the case of implementing the manufacturing method for a wheel-supporting rolling bearing unit of this invention, the aforementioned rotating section may be a disk that is connected and fastened to the side surface of the rotating side support flange that is formed around the outer peripheral surface of the rotating side member. In this case, the rotating side circular surfaces are both side surfaces of the outside end sections in the radial direction of the disk, and are the braking friction surfaces for pressing the pads (pad linings) of the disk brake against when braking. Also, using the one of the surfaces, either the braking friction surface or stationary side installation surface, as a reference surface, a flat surface processing is performed on the other surface, whereby the parallelism of the other surface with respect to the one surface is improved.

Moreover, in the case of implementing this kind of invention, it is preferred that after the flat surface processing is performed on the other surface, while the member comprising the one surface is rotated with respect to the member comprising the other surface, a flat surface processing be performed on the one surface using the other surface as a reference surface. As a result, the parallelism of the one surface with respect to the other surface is improved.

The wheel-supporting rolling bearing unit of this invention can be obtained by using any one of the manufacturing methods described above.

EFFECT OF THE INVENTION

As described above, with the wheel-supporting rolling bearing unit and manufacturing method thereof of the present invention, it is possible to sufficiently maintain the parallelism between the stationary side installation on which the support or caliper is installed, and the rotating side installation surface on which the disk is installed or the pair of braking friction surfaces formed on the disk. More specifically, when the rotating section is the rotating side installation surface on which the disk is installed, it is possible to improve the parallelism of one of the installation surfaces, either the rotating side installation surface or stationary side installation surface, with respect to the other installation surface. Therefore, it is possible to improve the positional relationship between the disk that is installed on the rotating side installation surface and the support or caliper that is installed on the stationary side installation surface. Also, when the rotating section is a pair of braking friction surfaces that are formed on the disk, it is possible to improve the positional relationship between the braking friction surfaces and the support or caliper that is installed on the stationary side installation surface. Therefore, when manufactured using either manufacturing method, it is possible to improve the state of contact between the both braking friction surfaces that are formed on the disk and the pair of pads that are attached to the support or caliper when braking. As a result, judder that occurs during braking can be suppressed.

Also, in the case of the present invention, a flat surface processing is performed on one of the surfaces, either the rotating side circular surface, which is the rotating side installation surface or both braking friction surfaces, or the stationary side installation surface, using the other surface as a reference surface, while rotating the member that comprises the one surface with respect to the member that comprises the other surface, so not only is it possible to improve the parallelism, but it is also possible to suppress run out in the axial direction of the rotating installation surface or both braking friction surfaces while rotating. Therefore, it is possible to suppress run out in the axial direction of the pair of braking friction surfaces that are formed on the disk to be installed on the rotating side installation surface, and furthermore directly suppress run out in the axial direction of both braking friction surfaces, and from this aspect as well, the occurrence of judder can be suppressed.

Moreover, after the flat surface processing has been performed on the other installation surface, by performing the flat surface processing on the one installation surface with the other installation surface as a reference surface, or after the flat surface processing has been performed on the other surface, by performing the flat surface processing on the one surface with the other surface as a reference surface, it is possible to more sufficiently maintain the parallelism between the stationary side installation surface, and the rotating side installation surface or both braking friction surfaces. Therefore, judder that occurs during braking can be even more sufficiently suppressed.

DESCRIPTION OF THE PREFERRED EMBODIMENTS

Figure 1:
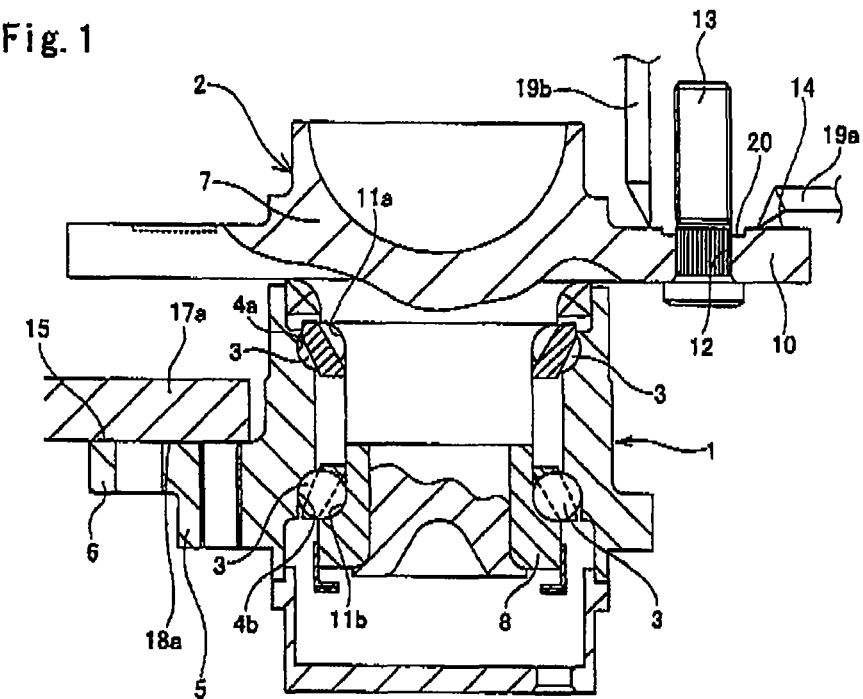
FIG. 1 is a cross-sectional drawing showing a first embodiment of the invention, and shows the state in which a turning process is performed as the finishing process for the rotating side installation surface of the wheel-supporting rolling bearing unit.
Figure 2:
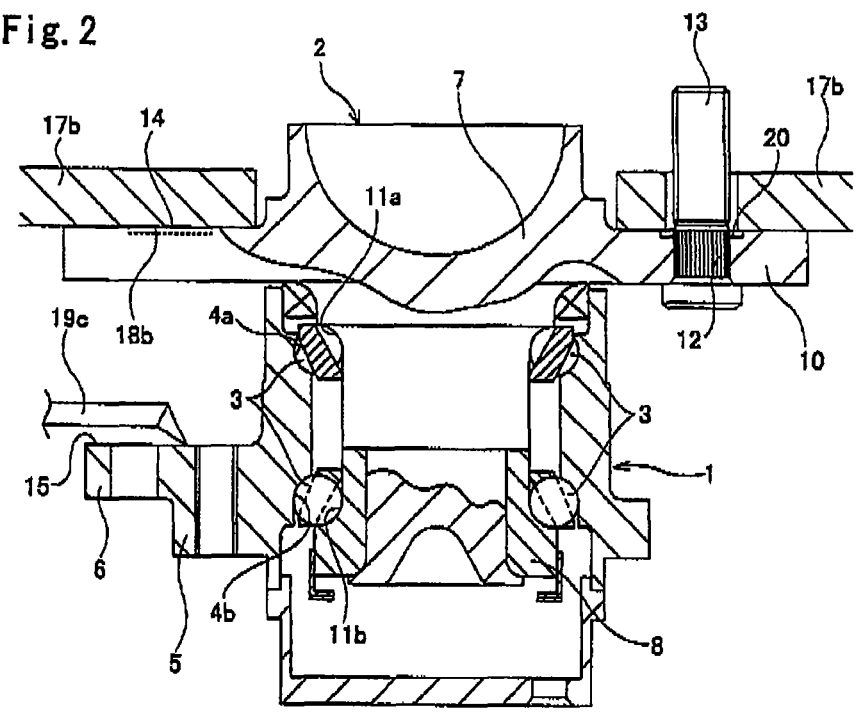
FIG. 2 is similarly a cross-sectional drawing showing the state in which a turning process is performed as the finishing process for the stationary side installation surface.
Figure 16:
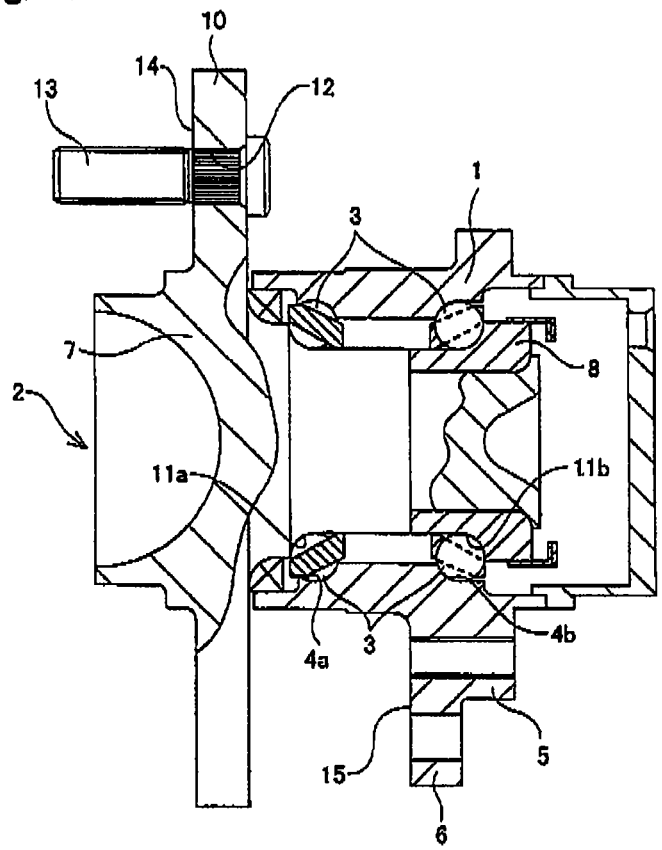
FIG. 16 is a cross-sectional drawing that shows a first example of a wheel-supporting rolling bearing unit that is the object of the present invention.
Figure 17:
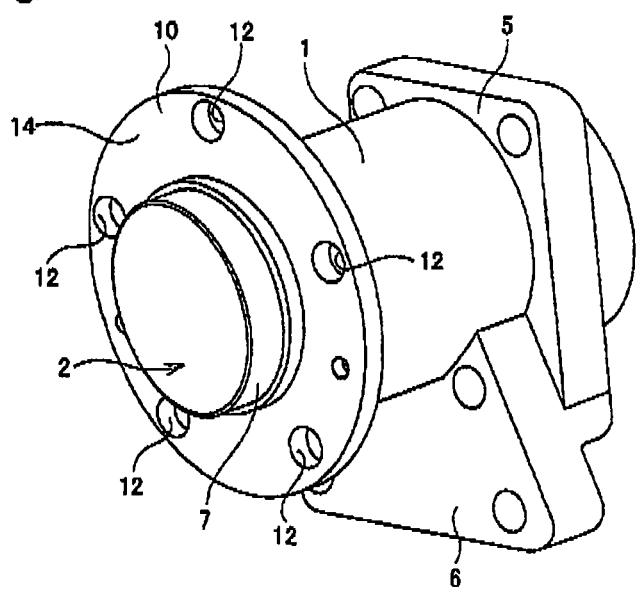
FIG. 17 is a partial pictorial drawing the wheel-supporting rolling bearing unit that is the object of the present invention.
Figure 18:
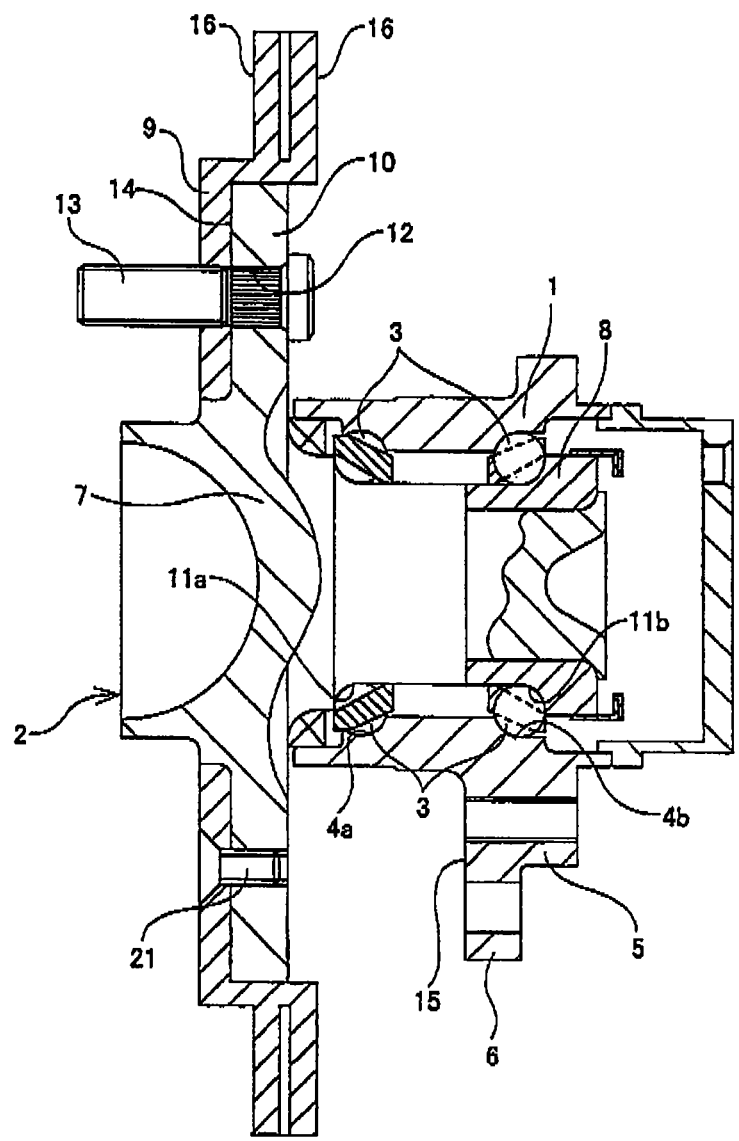
FIG. 18 is a cross-sectional drawing that shows a second example of a wheel-supporting rolling bearing unit that is the object of the present invention.

FIG. 1 and FIG. 2 show a first embodiment of the present invention. The feature of this embodiment is a method of performing a turning process as the finishing process of the outside surface of the rotating side support flange 10, which is the installation surface on which the disk 9 of a disk brake (see FIGS. 4 to 6 and 18) is installed (rotating side installation surface 14), and similarly the outside surface of the stationary side support flange 6, which is the installation surface on which the support or caliper (not shown) is installed (stationary side installation surface 15). The construction and function of the other parts, such as the basic construction of the wheel-supporting rolling bearing unit is the same as that of the wheel-supporting rolling bearing unit shown in FIG. 16 and FIG. 17 as described above. Therefore, the same reference numbers will be given to identical parts, and any redundant explanation of those parts will be omitted or simplified, so that the explanation here will center on the features of this embodiment.

In this embodiment, first, as shown in FIG. 1, studs 13 are press-fitted from the inside in the axial direction into the press-fit holes 12 that are formed at a plurality of locations in the circumferential direction of the rotating side support flange 10, and the wheel-supporting rolling bearing unit is constructed by assembling the outer race 1 and hub 2 by way of a plurality of balls 3. Also, in this state, the work of performing turning processing as the finishing process of the rotating side installation surface 14 can be performed by using the stationary side installation surface 15 as a reference surface. Therefore, in this embodiment, with the stationary side installation surface 15 brought into close contact with the side surface (bottom surface in FIG. 1) 18a of a support 17a, the stationary side support flange 6 is connected and fastened to the support 17a by a connection fastener such as a bolt or band (not shown). Also, in this state, while a drive apparatus (not shown) rotates and drives the hub 2, the turning process is performed on the rotating side installation surface 14 using tools 19a, 19b such as precision processing cutting tools. More specifically, one of the tools 19a is used to perform the turning process on the section of the rotating side installation surface 14 that is further outside in the radial direction than the circular ring shaped section (concave section 20 to be described later) that includes the openings of the press-fit holes 12. At the same time, the other tool 19b is used to similarly perform the turning process on the section that is further inside in the radial direction than the circular ring shaped section. When performing this kind of turning process, the tools 19a, 19b both move parallel with respect to the side surface 18a of the support 17a (stationary side surface 15). By performing the turning process on the rotating side installation surface 14 using the stationary side installation surface 15 as a reference surface, the flatness of the rotating side installation surface is improved, and the parallelism between the rotating side installation surface 14 and the stationary side installation surface 15 is improved.

In the case of this embodiment, the circular ring shaped section of the rotating side installation surface 14, is a concave section 20 from before the studs 13 are press-fitted into the press-fit holes 12. By having this concave section 20, not only does it become difficult for distortion to occur on the rotating side installation surface 14 when press-fitting the studs 13 into these press-fit holes 12, but after the turning process is completed, the circular ring shaped section prevents protrusions in the axial direction more than other sections (sections where the turning process is performed using the tools 19a, 19b). Also, in this embodiment, turning of the rotating side installation surface 14 is performed after the studs 13 are press-fitted into the press-fit holes 12, so even in the case that distortions occur in the rotating side installation surface 14 due to press-fitting, it is possible to eliminate the distortions by the turning process.

After performing turning of the rotating side installation surface 14 in this way, then as shown in FIG. 2, the work of turning of the stationary installation surface 15 can be performed as the finishing process by using the rotating side installation surface as a reference surface. Therefore, in this embodiment, with the rotating side installation surface 14 in close contact with the side surface (bottom surface in FIG. 2) of the support 17b, the rotating side flange 10 is connected and fastened to the support 17b by a connection fastener such as a bolt or band (or screwing a nut onto a stud 13) (not shown). Also, in this state, the turning process is performed on the stationary side installation surface 15 using a tool 19c such as precision processing cutting tools, while rotating and driving the outer race 1 by a drive device (not shown). When performing this turning process, the tool 19c moves parallel with respect to the side surface 18b of the support 17b (rotating side installation surface 14). By performing the turning process on the stationary side installation surface 15 with the rotating side installation surface 14 as a reference surface, the flatness of the stationary side installation surface 15 is improved, and the parallelism between the stationary side installation surface 15 and the rotating side installation surface 14 is further improved.

As described above, in the case of the wheel-supporting rolling bearing unit and manufacturing method thereof of this embodiment, it is possible to improve the parallelism between the rotating side and stationary side installation surfaces 14, 15. Therefore, it is possible to improve the positional relationship between the disk that is installed on the rotating side installation surface 14 and the support or caliper that is installed on the stationary side installation surface 15. Also, it is possible to improve the state of contact during braking between both side surfaces of the disk and the pair of pads that are attached to the caliper. As a result, it is possible to suppress the occurrence of judder during braking. Moreover, in this embodiment, the turning process is performed on the rotating side installation surface 14 while rotating the hub 2 with respect to the outer race 1, so not only is it possible to improve the parallelism between both installation surfaces 14, 15, but when the automobile is running, it is also possible to suppress run out in the axial direction of the rotating side installation surface 14 (run out in the parallel state is also suppressed). Also, it is possible to suppress run out in the axial direction of both side surfaces of the disk that is installed on the rotating side installation surface 14, and from this aspect as well, it is possible to suppress the occurrence of judder.

Figure 3:
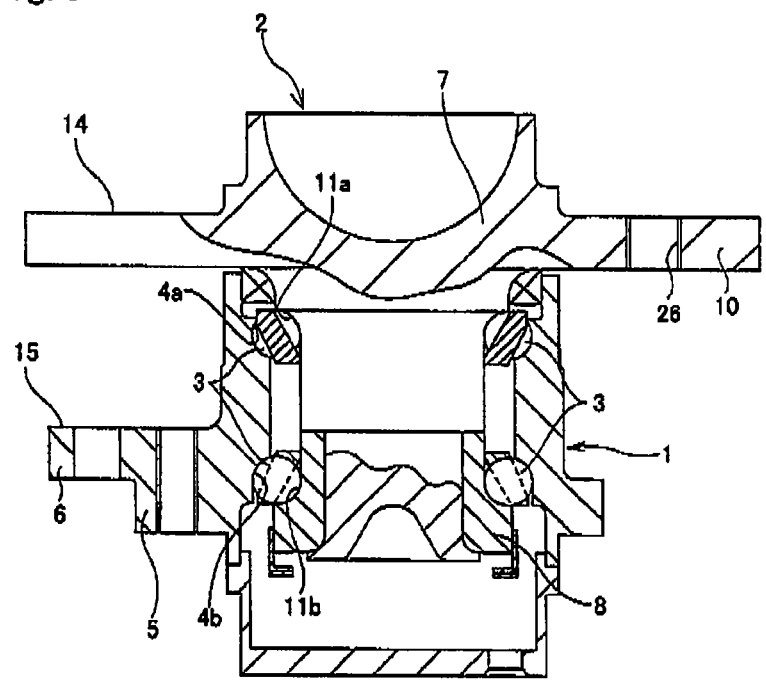
FIG. 3 is a cross-sectional drawing showing another example of a wheel-supporting rolling bearing unit to which the present invention can be applied.

In the embodiment described above, the present invention was applied to construction in which studs 13 are press-fitted inside the press-fit holes 12 that are formed in the rotating side support flange 10. However, the invention could also be applied to the construction shown in FIG. 3, or in other words, construction in which bolts (not shown) are passed through the wheel and disc rotor, and screwed into and fastened to screw holes 26 that are formed in the rotating side support flange 10. Of course, in this case, the turning process of the rotating side installation surface 14 is performed in the state before the bolts are screwed into the screw holes 26.

Also, in the first embodiment described above, the turning process was performed on the stationary side installation surface 15 after the turning process of the rotating side installation surface 14 was performed, however, opposite to this, it is possible to perform the turning process on the rotating side installation surface 14 after the turning process of the stationary side installation surface 15 has been performed. Moreover, in the first embodiment described above, both the work of the turning process of the rotating side installation surface 14 was performed with the stationary side installation surface 15 as a reference surface, and the work of the turning process of the stationary side installation surface 15 was performed with the rotating side installation surface 14 as a reference surface, however, in this invention, it is also possible to perform the work of just one of these. However, in that case, it is preferred that the flatness of the installation surface to be the reference surface be finished adequately beforehand. Furthermore, in the first embodiment described above, turning was employed as the process for finishing the rotating side and stationary side installation surfaces 14, 15, however, instead of this (or in addition to this), it is possible to employ grinding process as the finishing process.

Also, in the first embodiment described above, the invention was applied to construction in which the stationary side support flange 6 was formed in the section adjacent to the outside in the axial direction of the connection flange 5 on the outer peripheral surface of the outer race 1. However, in US Patent Application Publication No. 2003/0165280 construction is disclosed in which the stationary side support flange is integrated with the outside end section in the radial direction of the connection flange. Of course, the present invention could also be applied in the case of this kind of construction as disclosed in US Patent Application Publication No. 2003/0165280. Furthermore, the present invention could also be applied to construction in which the inside surface in the axial direction of both sides surfaces of the connection flange is a surface that protrudes out with respect to the knuckle, and the outside surface in the axial direction is the installation surface for the support or caliper.

[Second Embodiment]

Figure 4:
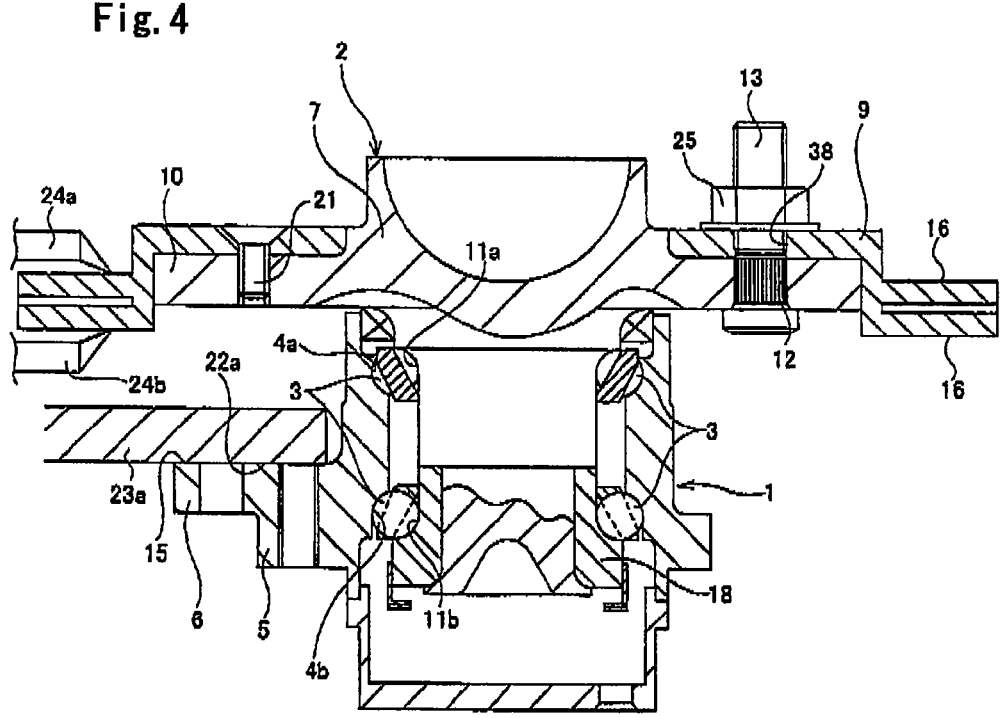
FIG. 4 is a cross-sectional drawing showing a second embodiment of the invention, and shows the state in which a turning process is performed as the finishing process for the pair of braking friction surfaces.
Figure 5:
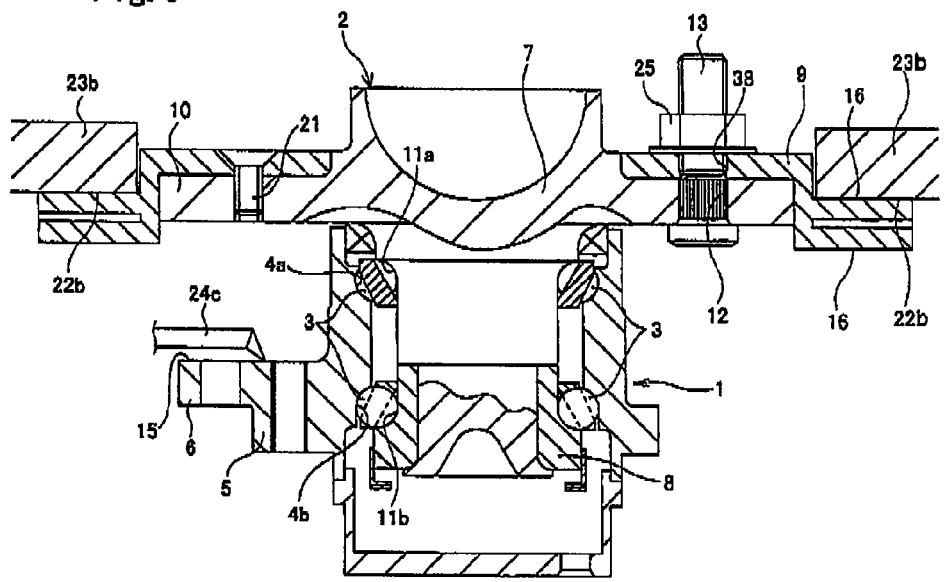
FIG. 5 is similarly a cross-sectional drawing showing the state in which a turning process is performed as the finishing process for the stationary side installation surface.

FIG. 4 and FIG. 5 show a second embodiment of the invention. The feature of this embodiment is a method of performing a turning process as the finishing process for the pair of braking friction surfaces 16 that are both side surfaces on the outer end section in the radial direction of the disk 9, and for the stationary side installation surface 15 that is the outside surface of the stationary side support flange 6. The basic construction of the wheel-supporting rolling bearing unit with the disk of this embodiment and the construction and function of other parts are the same as in the case of the wheel-supporting rolling bearing unit with a disk shown in FIG. 18 and described above. Therefore, the same reference numbers are given to identical parts, and any redundant explanation is omitted or simplified, so that the explanation here centers on the features of this embodiment.

As shown in FIG. 4, in this embodiment, for the wheel-supporting rolling bearing unit with disk is constructed by assembling the outer race 1 and the hub 2 by way of the plurality of balls 3, and connecting and fastening the disk 9 to the outside surface of the rotating side support flange 10 by one or a plurality of screws 21. Furthermore, studs 13 are press-fitted into the press-fit holes 12 of the rotating side support flange 10 and inserted through each through hole 38 of the disk 9, and further tightened by screwing nuts 25 on the male screw sections of the studs 13. Also, by fastening the disk 9 to the outside surface of the rotating side support flange 10 by the tightening force of the nuts 25, sufficient connection strength is maintained between the rotating side support flange 10 and the disk 9.

Also, in this state, the work of performing the turning process as the finishing process on the pair of braking friction surfaces 16 formed on the disk 9 is performed by using the stationary side installation surface 15 as a reference surface. Therefore, in this embodiment in the state of the stationary side installation surface 15 in close contact with the side surface (bottom surface in FIG. 4) 22a of the support 23a, the stationary side support flange 6 is supported by and fastened to the support 23a by a connection fastener such as a bolt or band (not shown). Also, in this state, the turning process is performed on both of the braking friction surfaces 16 using tools 24a, 24b such as precision processing cutting tools while the drive device (not shown) rotates and drives the hub 2. When performing this kind of turning process, the tools 24a, 24b move parallel to the side surface 22a of the support 23a (stationary side installation surface 15). Also, by performing the turning process on the pair of braking friction surfaces 16 with the stationary side installation surface 15 as a reference surface in this way, the flatness of these braking friction surfaces 16 is improved, as well as the parallelism between both of these braking friction surfaces 16 and the stationary side installation surface 15 is improved.

After performing the turning process on both of the braking friction surfaces 16 as described above, next, as shown in FIG. 5, the work of performing the turning process as the finishing process on the stationary side installation surface 15 is performed by using the braking friction surface 16 on the outside in the axial direction as a reference surface. Therefore, in this embodiment, with the braking friction surface 16 on the outside in the axial direction in close contact with the side surface (bottom surface in FIG. 5) 22b of the support 23b, the disk 9 and hub 2 are supported by and fastened to the support 23b by a connection fastener such as a bolt or band (not shown). Also, in this state, the turning process is performed on the stationary side installation surface 15 using a tool 24c such as precision processing cutting tools while the outer race 1 is rotated and driven by a drive device (not shown). When performing this turning process, the tool 24c is moved parallel to the side surface 22b of the support 23b (braking friction surface 16 on the outside in the axial direction). Also, by performing this turning process on the stationary side installation surface 15 with the braking friction surface 16 on the outside in the axial direction as a reference surface in this way, the flatness of the stationary side installation surface 15 is improved, as well as the parallelism between the stationary side installation surface 15 and both of the braking friction surfaces 16 is further improved.

After the turning process is performed on the stationary side installation surface 15 as described above, the respective nuts 25 are removed from the male screw sections of the respective studs 13. When it is possible to sufficiently maintain the connection strength of the disk 9 to the rotating side support flange 10 by using screws 21 when implementing the present invention, the turning process described above can be performed without using the nuts 25. Also, the reference surface that is used when performing the turning process on the stationary side installation surface 15 can be the braking friction surface 16 on the inside in the axial direction.

As described above, in the case of the wheel-supporting rolling bearing unit with a disk and manufacturing method thereof of this embodiment, it is possible to improve the parallelism between the pair of braking friction surfaces 16 and the stationary side installation surface 15. Therefore, it is possible to improve the relationship between both of the braking friction surfaces 16 and the support or caliper that is installed on the stationary side installation surface 15. Also, it is possible to improve the state of contact during braking between both of the braking friction surfaces 16 and the pair of pads that are attached to the caliper. As a result, the occurrence of judder during braking can be suppressed. Moreover, in the case of this embodiment, the turning process is performed on both of the braking friction surfaces 16 while rotating the hub 2 with respect to the outer race 1, and therefore when the automobile is moving, run out in the axial direction of both of the braking friction surfaces 16 can be suppressed. From this aspect as well, it is possible to suppress the occurrence of judder.

Figure 6:
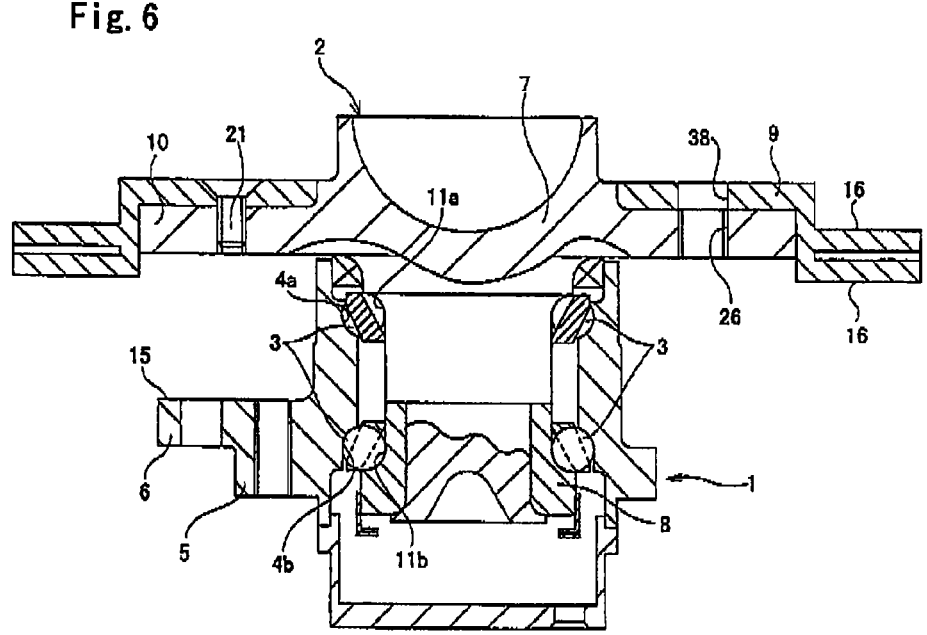
FIG. 6 is a cross-sectional drawing showing another example of a wheel-supporting rolling bearing unit with disk to which the present invention can be applied.

In the second embodiment of the invention described above, the present invention was applied to construction in which studs 13 are press-fitted inside press-fit holes 12 that are formed in the rotating support flange 10. However, the invention can also be applied to construction as shown in FIG. 6, or in other words, construction in which bolts (not shown) are inserted through the wheel and disk 9 when assembling the unit in the automobile, and screwing the bolts into screw holes that are formed in the rotating side support flange 10.

Also, in the second embodiment of the invention described above, the turning process is performed on the stationary side installation surface 15 after the turning process has been performed on the pair of braking friction surfaces 16, however, opposite to this, it is possible to perform the turning process of both braking friction surfaces 16 after the turning process has been performed on the stationary side installation surface 15. Moreover, in this second embodiment, both the work of performing the turning process on both braking friction surfaces 16 with the stationary installation surface 15 as a reference surface, and the work of performing the turning process on the stationary side installation surface 15 with one of the braking friction surfaces 16 as a reference surface are performed, however, it is also possible to perform the work of just one of these. However, in this case, it is preferred that the flatness of the surface to be a reference surface be finished adequately beforehand. Furthermore, in this second embodiment described above, a turning process was employed as the finishing process performed on both of the braking friction surfaces 16 and the stationary side installation surface 15, however, instead of this (or in addition to this), it is possible to employ grinding process as the finishing process.

Also, this second embodiment described above is implemented for construction in which the stationary side support flange 6 is formed around the section adjacent to the outside in the axial direction of the connection flange 5 of the outer peripheral surface of the outer race 1. However, of course this embodiment can also be implemented in the case of construction such as disclosed in US Patent Application Publication No. 2003/0165280, in which the stationary side support flange is integrated with the outer end in the radial direction of the connection flange. Furthermore, the present invention could also be applied to construction in which the inside surface in the axial direction of both sides surfaces of the connection flange is a surface that protrudes out with respect to the knuckle, and the outside surface in the axial direction is the installation surface for the support or caliper.

[Third Embodiment]

Figure 7:
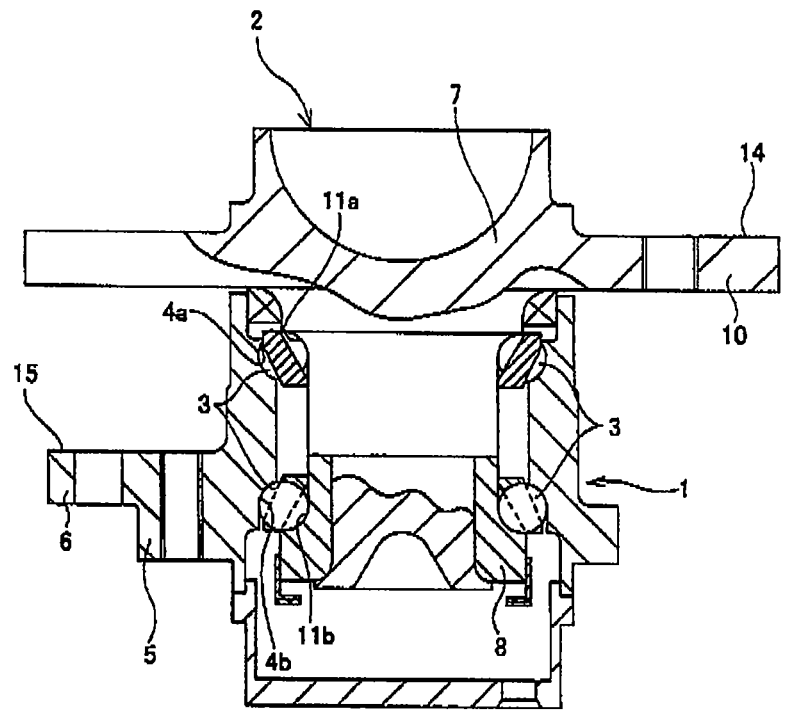
FIG. 7 is a cross-sectional drawing showing a third embodiment of the invention.
Figure 8:
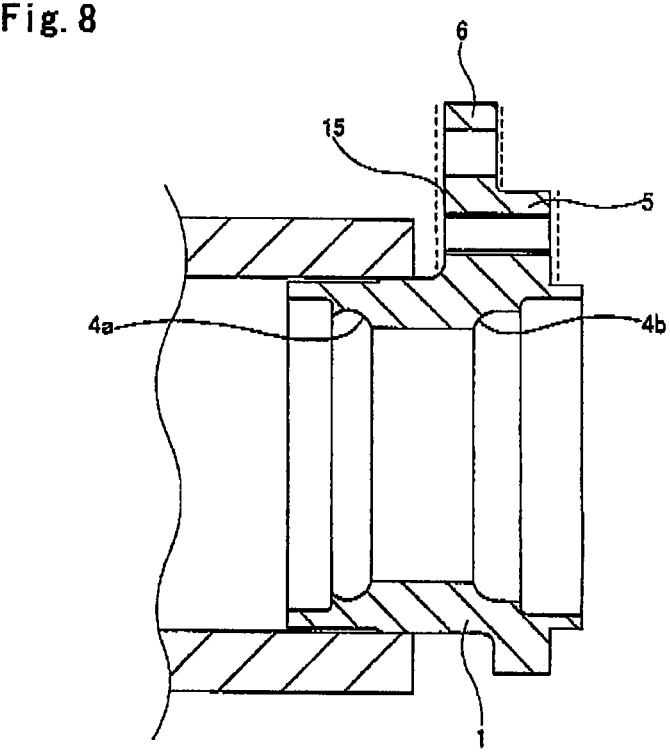
FIG. 8 is a drawing for explaining the state in which each of the surfaces around the outer peripheral surface of the outer race is processed.

FIG. 7 and FIG. 8 show a third embodiment of the present invention. In this embodiment, even when the space between the outside surface in the axial direction of the stationary side support flange 6 and the inside surface in the axial direction of the rotating side support flange 10 is narrow, it is the intention of this embodiment to improve the parallelism between the outside surface in the axial direction of the stationary side support flange 6 (stationary side installation surface 15) and the inside surface in the axial direction of the rotating side support flange 10. In other words, in the case of a compact wheel-supporting rolling bearing unit, the space between the outside surface in the axial direction of the stationary side support flange 6 and the inside surface in the axial direction of the rotating side support flange 10 is narrow, and when left as is, there is a possibility that the outside surface in the axial direction of the stationary side support flange 6 cannot be fastened to and supported by a section having sufficiently high enough rigidity. Also, when it is not possible to support or fasten the surface, it is difficult to rotate the hub 2 and perform the finishing process of the outside surface in the axial direction of rotating side support flange 10 (rotating side installation surface 14) with the outside surface in the axial direction of the stationary side support flange 6 as a reference surface. In this case as well, it is possible to perform the finishing process of the outside surface in the axial direction of the stationary side support flange 6 with the outside surface in the axial direction of the rotating side support flange 10 as a reference surface. However, even though the rotating side support flange 10 is a circular shape that is continuous around the entire circumference thereof, the stationary side support flange 6 is formed on only part in the circumferential direction, and therefore it may be difficult to flatly finish the outside surface in the axial direction of the stationary side support flange 6 while rotating the outer race 1.

Therefore, in this embodiment, with the outside surface in the axial direction of the stationary side support flange 6 as a reference, a middle reference side surface section that is located on the outer race 1 further on the inside in the axial direction than the outside surface in the axial direction of the stationary side support flange 6 is finished so that it is parallel with the outside surface in the axial direction. This middle reference side surface section is a surface on either the inside surface in the axial direction of the stationary side support flange 6 or the inside surface in the axial direction of the connection flange 5 that is formed on the outer peripheral surface of the outer race 1. In the case of using either surface as the middle reference side surface section, by rotating the hub 2 and performing the flat surface processing on the outside surface in the axial direction of the rotating side support flange 10 with this middle reference side surface section as a reference surface and with the outer race supported and secured, the parallelism of the outside surface in the axial direction of the rotating side support flange 10 with respect to the outside surface in the axial direction of the stationary side support flange 6 is improved.

When implementing the manufacturing method of this kind of embodiment, it is necessary that the stationary side support flange 6 or the inside surface in the axial direction of the connection flange 5 that is used as the middle reference side surface section be made very parallel with the outside surface in the axial direction of the stationary side support flange 6 that is the original reference surface. Therefore, in the case of this embodiment, in the state that the holder (chuck) of a finishing device such as a precision lathe keeps holding the outer race 1 (secured so that it cannot be removed from the chuck during processing), so called 'One-chuck processing' is performed so that the outside surface in the axial direction of the stationary side support flange 6, and the inside surface in the axial direction of the stationary side support flange 6 or connection flange 5, which are indicated by dotted lines in FIG. 8, are finished. By performing the finishing process on the outside surface in the axial direction of the stationary support flange 6 and the surface used as the middle reference side surface section by one-chuck processing without removing the outer race 1 from the holder, it is possible to make these surfaces very parallel with each other.

Also, the middle reference surface section that is obtained in this way can be held in the holder of the finishing device without interfering with the rotating side flange 10 (this middle reference surface section comes in contact with the reference surface of this holder). Therefore, by using the inside surface in the axial direction of the stationary side support flange 6 or the connection flange 5 as the middle reference surface section, the outside surface in the axial direction of the rotating side support flange 10 can be finished even though the space between the outside surface in the axial direction of the stationary side support flange 6 and the inside surface in the axial direction of the rotating side support flange 10 is narrow. In this case, the outside surface in the axial direction of the stationary side support flange 6 (stationary side installation surface 15) is indirectly used as the reference surface for finishing the outside surface in the axial direction of the rotating side support flange 10. A manufacturing method as in this embodiment can also be implemented for a wheel-supporting rolling bearing unit with disk.

[Fourth Embodiment]

Figure 9:
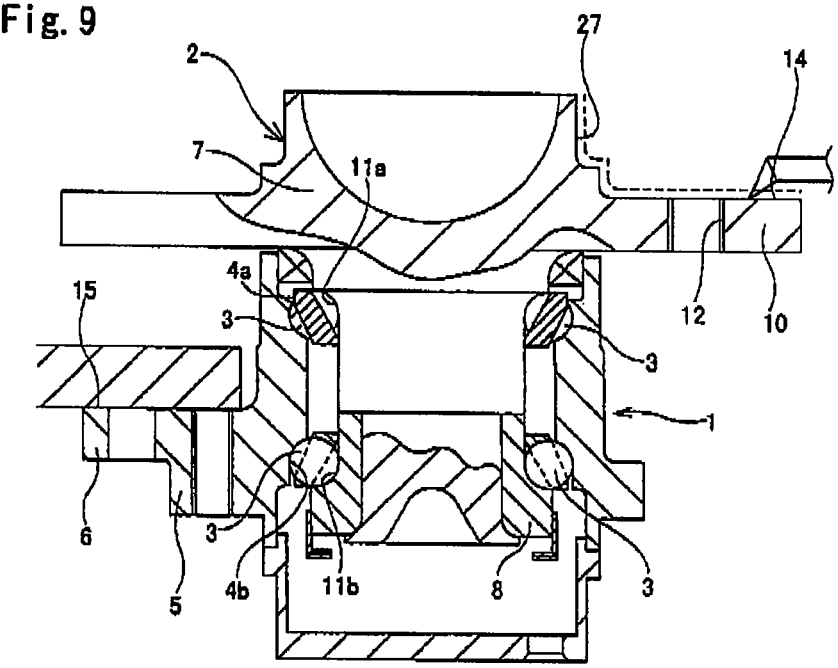
FIG. 9 is a cross-sectional drawing showing a fourth embodiment of the invention.

FIG. 9 shows a fourth embodiment of the present invention. In this embodiment, the outside surface in the axial direction of the stationary side support flange 6 that is formed on the outer peripheral surface of the outer race 1 (stationary side installation surface 15) is used as a reference, and in order to finish the outside surface in the axial direction of the rotating side support flange 10 that is formed around the outer peripheral surface of the hub 2 (rotating side installation surface 14), in the state that the hub 2 is still held (by one-chuck), the outer peripheral surface of a positioning cylindrical section 27 that is formed around the section situated nearer the inner radial side of the outside surface in the axial direction of the rotating side support flange 10 (section indicated by the dotted line in FIG. 9) is also finished. This positioning cylindrical section 27 makes it possible to perform positioning in the radial direction of the disk 9 (for example, refer to FIG. 6) and wheel (not shown). Therefore, it is necessary that the center axis of the outer peripheral surface of the positioning cylindrical section 27 coincide with the center of rotation of the hub 2. In this embodiment, the finishing process of the outside surface in the axial direction of the rotating side support flange 10 and the finishing process of the outer peripheral surface around the positioning cylindrical section 27 are performed while rotating the hub 2 on the inner radial side of the outer race 1 without having to remove and attach the hub 2 from and to the processing equipment, and therefore it is possible to make the center of rotation of the hub 2 coincide exactly with the center axis of the positioning cylindrical section 27. Therefore, runout of the wheel that is fastened to the hub 2 can be suppressed, and it is possible to improve performance such as stability of the moving automobile.

[Fifth Embodiment]

Figure 10:
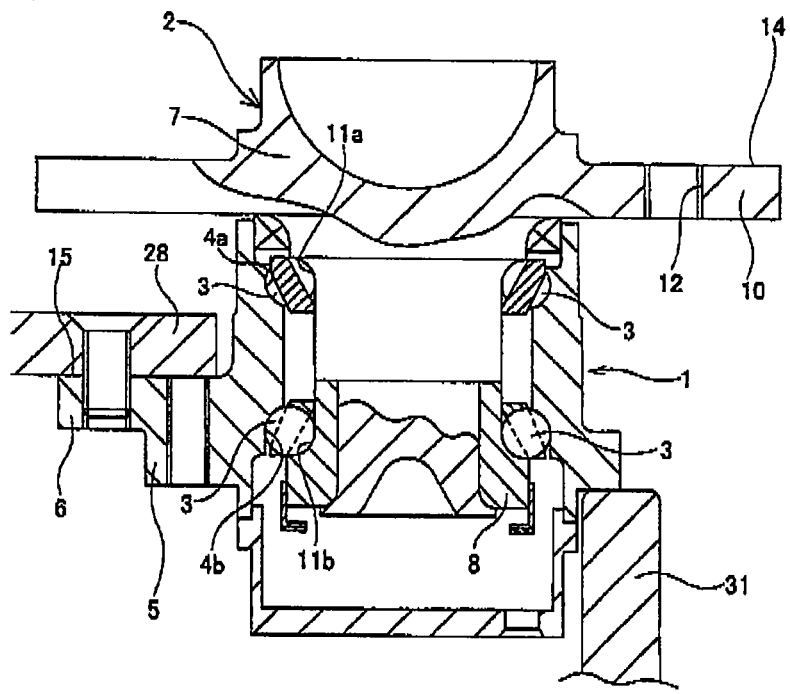
FIG. 10 is a cross-sectional drawing showing a fifth embodiment of the invention.
Figure 11:
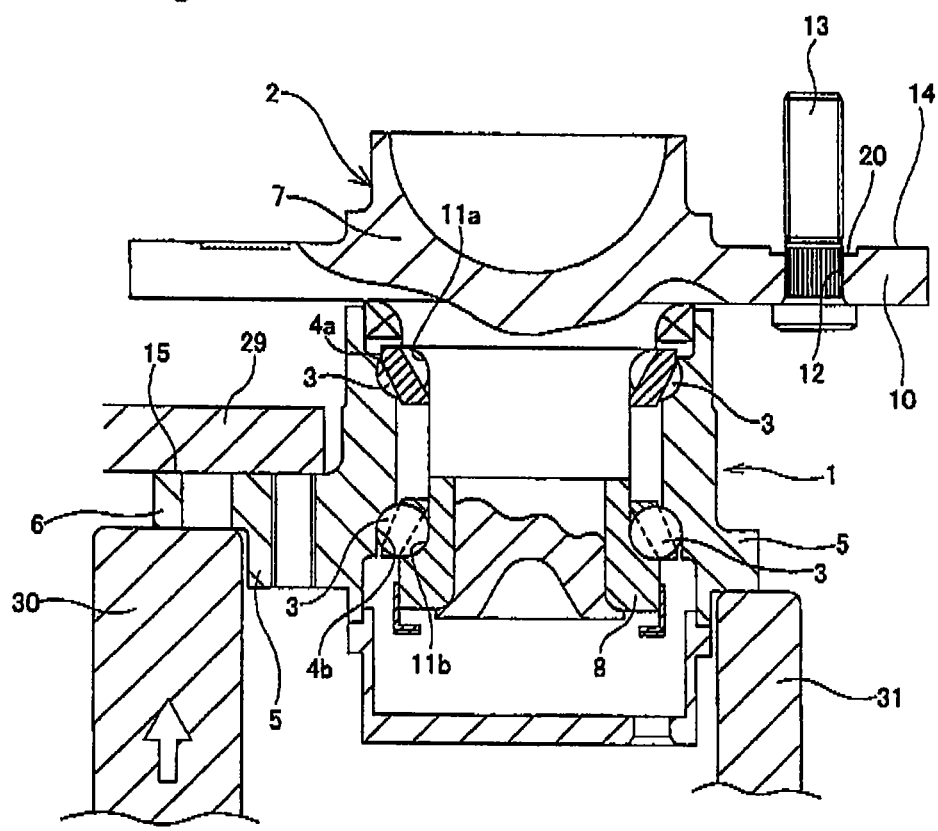
FIG. 11 is a cross-sectional drawing similarly showing another example.

FIG. 10 and FIG. 11 show a fifth embodiment of the present invention. In this embodiment, when performing the finishing process on the outside surface in the axial direction of the rotating side support flange 10 (rotating side installation surface 14) with the outer race 1 supported by the stationary side support flange 6, it is the intention of this embodiment to make the outside surface in the axial direction of the rotating side support flange 10 coincide with the horizontal surface. The stationary side support flange 6 is for supporting and fastening the support or caliper of the disk brake to the outer race 1, and therefore it is located on only part of the surface in the circumferential direction. Therefore, when the stationary side support flange 6 supports the outer race 1, a cantilever support state 15 formed in which the outer race and the hub 2 that is assembled on the inner radial side of the outer race 1 extend from one side of the stationary side support flange 6.

This stationary side support flange 6 supports the braking torque during braking, so has high rigidity and there is a little flexure due to the weight of the outer race 1 and hub 2, however it cannot be said to have no flexure at all. When the stationary side support flange 6 is fastened by screws to a support plate 28 as shown in FIG. 10, and when the stationary side support flange 6 is held (clamped) between a receiving plate 29 and pressure arm 30 as shown in FIG. 11, the flexure may be occurred. In either case, when there is flexure, the direction of the center axis of the hub 2 shifts from the vertical direction. Therefore, even when performing the finishing process on the outside surface in the axial direction of the rotating side support flange 10 with a processing tool (cutting tool) that moves in the horizontal direction, the outside surface in the axial direction of this rotating side support flange 10 does not become to face in the perpendicular direction with respect to the center axis of rotation of the hub 2. As a result, both side surfaces in the axial direction of the disk 9 (for example, refer to FIGS. 4 to 6) that is fastened to and supported by the outside surface in the axial direction of the rotating side support flange 10 become to run out in the axial direction as the hub 2 rotates.

In this embodiment, in order to prevent the flexure of the stationary side support flange 6 due to the weight of the outer race 1 and hub 2 that becomes the cause of this kind of run out, the bottom surface of the connection flange 5 that is formed on the outer peripheral surface of the outer race 1 is supported on the side opposite in the radial direction of the stationary side support flange 6 by a support arm 31. In other words, the center axis of the outer race 1 and hub 2 faces toward the vertical direction, and with the stationary side support flange 6 fastened to and supported by the support plate 28, or fastened and supported between the receiving plate 29 and pressure arm 30, and the tip end surface of the support arm (top end surface) comes in contact with the bottom surface of the connection flange 5. Also, when performing the flat surface processing on the rotating side installation surface 14 with the stationary side installation surface 15 as a reference surface, the weight of both members 1, 2 prevent displacement of the center axis of the outer race 1 and hub 2 from the vertical direction. The support arm 31 can be pressed upward by an elastic force that corresponds to the weight of both of these members 1, 2, or can be secured at a specified height. In either case, by performing the flat surface processing of the rotating side installation surface while preventing the aforementioned flexure by the support arm 31, it becomes possible to locate this rotating side installation surface 14 in the strictly-perpendicular direction with respect to the center of rotation of the hub 2. The manufacturing method of this embodiment as well can be performed for a wheel-supporting rolling bearing unit with disk.

[Considerations When Implementing the Invention]

A feature of the manufacturing method of the wheel-supporting rolling bearing unit of this invention is that after the stationary side member such as the outer race 1 and the rotating side member such as the hub 2 have been assembled together by way of a plurality of rolling bodies so that they can freely rotate relative to each other, the parallelism between the rotating side installation surface 14, or the circular surfaces on the rotating side such as both side surfaces in the axial direction of the disk 9, and the stationary side installation surface 15 is improved. Since a finishing process is performed on each of the surfaces after the stationary side member and rotating side member have been assembled in this way, even though the shapes of both members may deform due to heat processing or the like, it is possible to remove the deformed areas by the finishing process described above.

Figure 12:
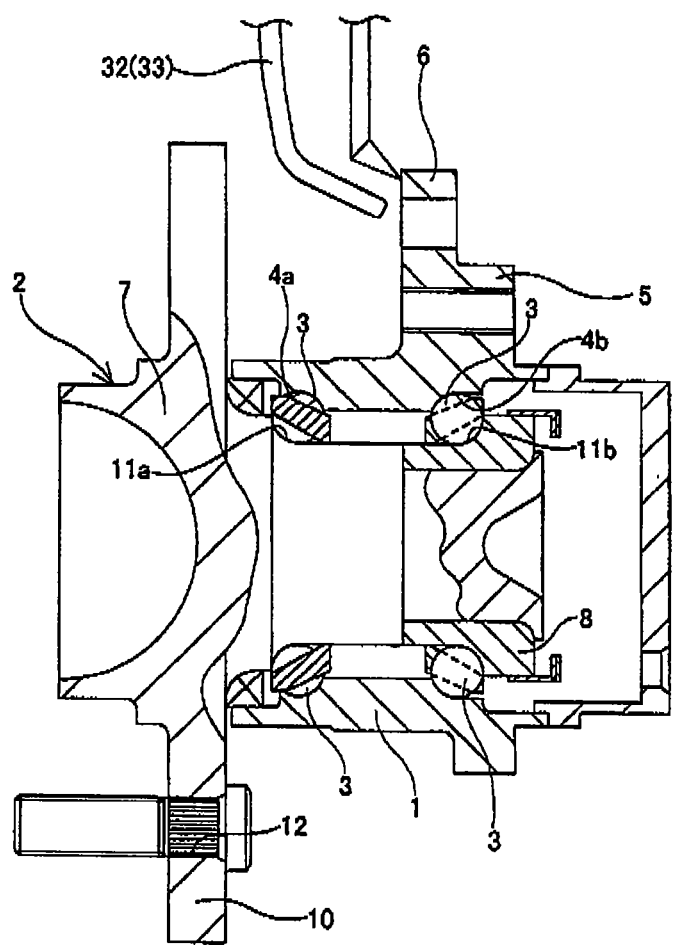
FIG. 12 is a cross-sectional drawing for explaining a first example of items that must be noted when employing the invention.

However, after both members have been assembled together by way of the rolling bodies, consideration is needed in order that cutting debris, abrasion powder or cutting lubricant (coolant) do not get into the area where the rolling bodies are located. Therefore, as shown in FIG. 12, it is preferred that compressed air be blown from a nozzle 32 to blow away any cutting debris, abrasion powder or cutting lubricant, or that cutting debris, abrasion powder or cutting lubricant be sucked in and discharged by a suction hose 33.

Figure 13:
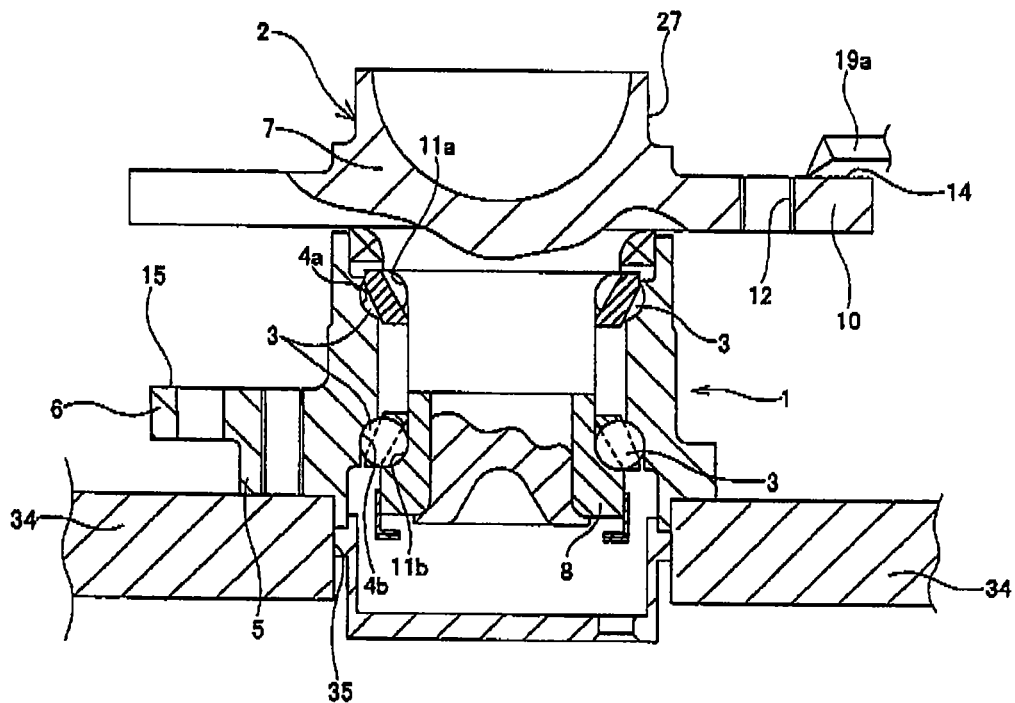
FIG. 13 is a cross-sectional drawing for similarly explaining a second example.
Figure 14:
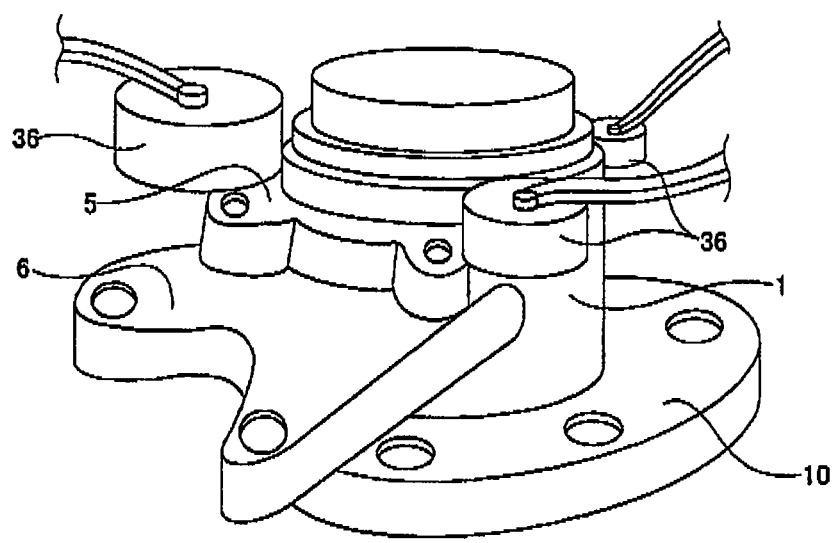
FIG. 14 is a pictorial drawing similarly showing a different example.

Moreover, when performing the finishing process on the above respective surfaces in a state that the outer race 1 formed with the stationary side support flange 6 on the outer peripheral surface thereof, it is necessary to keep the center axis of the outer race 1 in the vertical direction (centering). In this case, the stationary side support flange 6 is located on only part in the circumferential direction, and therefore it is not possible to use this stationary side support flange 6 to perform centering. Therefore, as shown in FIG. 13, it is considered to fit the portion (knuckle pilot section) that is formed on the inside end in the axial direction of the outer race 1 that fits the inner race 1 into the support hole of the knuckle of the suspension inside a reference hole 35 of the support plate 34 without any movements; or as shown in FIG. 14, it is possible to perform centering of the outer race 1 by having centering rollers 36 that are located at three locations in the circumferential direction press against the knuckle pilot section. In either case, finishing of the outside surface in the axial direction of the rotating side support flange 10 is performed after fastening and supporting the outer race 1 by firmly holding the stationary side support 6 from both sides in the axial direction after centering as shown in FIG. 11.

Figure 15:
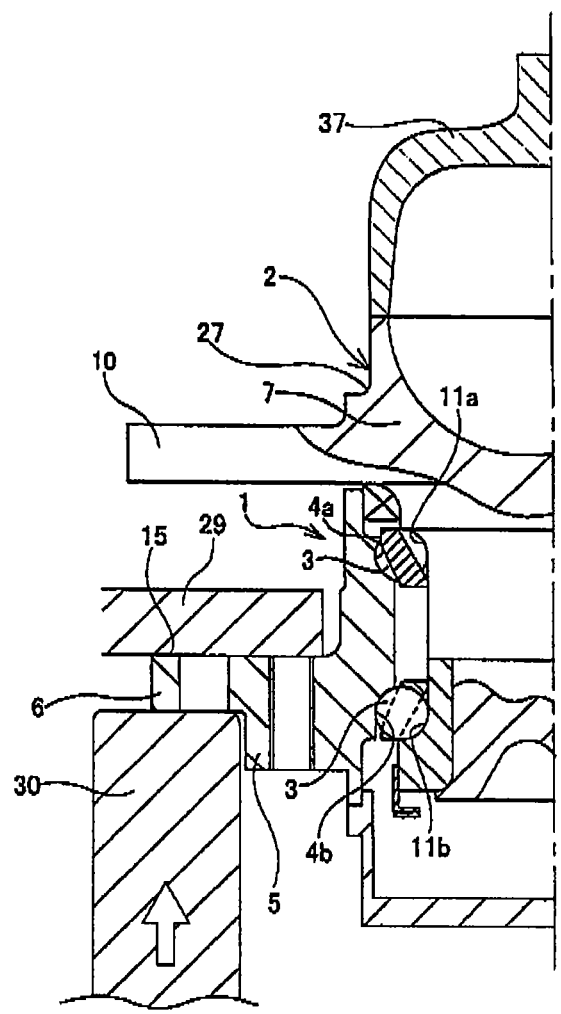
FIG. 15 is a cross-sectional for explaining a third example of items that must be noted when employing the invention.

Furthermore, when performing the finishing process of the outside surface in the axial direction of the rotating side support flange 10, it is necessary to rotate the hub 2 on the inner radial side of the outer race 1. Therefore, with construction as shown in FIG. 14 for example, it is possible to drive and rotate the hub 2 by rotating some or all of the centering rollers 36, or as shown in FIG. 15, by a drive arm 37 that engages by friction with the outside end surface in the axial direction of the hub 2. Also, it is possible to drive and rotate the hub 2 by engaging protrusions formed on part of the outside end surface in the axial direction of the hub 2 on the section that surrounds the positioning cylinder 27 with part of the drive arm.

Industrial Application

The manufacturing method of the third to fifth embodiments shown in FIGS. 7 to 11 can be applied in the case of performing the finishing process on both side surfaces in the axial direction of the disk 9 with the stationary side installation surface 15, which is the outside surface in the axial direction of the stationary side support flange 6, as a reference. However, in the case of the finishing process that is performed on the outer peripheral surface of the positioning cylinder 27 shown in FIG. 9, only the portion of the end half portion of the positioning cylinder 27 (top half in FIG. 9) that fits around the wheel becomes the subject of the finishing process.

What is claimed is:

1. A manufacturing method for a wheel-supporting rolling bearing unit; wherein the wheel-supporting rolling bearing unit comprises:
    a stationary side member,
    a rotating side member, and
    a plurality of rolling bodies; wherein of these,
    the stationary side member has a stationary side raceway formed around a stationary side peripheral surface thereof, and a stationary side support flange having two side surfaces for fastening to and supporting a caliper or support of a disk brake formed on an outer peripheral surface thereof, and does not rotate in a connected and fastened state to a suspension in use;
    the rotating side member has a rotating side raceway formed around a rotating side peripheral surface thereof, and rotates together with a wheel and a disk of the disk brake in use, and a rotating side support flange having two side surfaces for fastening to and supporting the wheel and the disk of the disk brake formed around an outer peripheral surface of the rotating side member that comprises a rotating side installation surface for installing the disk in use that is at least part of either one of the side surfaces of the rotating side support flange, and that is to be perpendicular with respect to the center axis of rotation of the rotating side member;
    the rolling bodies are located between the stationary side raceway and the rotating side raceway so that they can roll freely; and at least part of either one of the side surfaces of the stationary side support flange functions as a stationary side installation surface for installing the caliper or support in use; and
    after the stationary side member, rotating side member and rolling bodies are assembled together, while the member comprising one of the installation surfaces, either the rotating side installation surface or stationary side installation surface, is rotated with respect to the member comprising the other installation surface, a flat surface processing is performed at the same time on the one installation surface, using the other installation surface as a reference surface, such that the parallelism of the one installation surface with respect to the other installation surface is improved, and,
    after the flat surface processing has been performed on the one installation surface, while the member comprising the other installation surface is rotated with respect to the member comprising the one installation surface, a flat surface processing is performed at the same time on the other installation surface using the one installation surface as a reference surface, such that the parallelism of the other installation surface with respect to the one installation surface is improved.

2. The manufacturing method for a wheel-supporting rolling bearing unit of claim 1; wherein
    the stationary side member is an outer race having a double row of outer raceways formed around an inner peripheral surface thereof;
    the rotating side member is a hub having a double row of inner raceways formed around an outer peripheral surface thereof;
    the stationary side support flange is formed on an outer peripheral surface in a section toward an outside end section in an axial direction of the outer race; the stationary side installation surface is an outside surface in an axial direction of the stationary side support flange;

the rotating side support flange is formed on the outer peripheral surface of the hub;

the rotating side installation surface is an outside surface in an axial direction of the rotating side support flange; and after a middle reference side surface section of the outer race that is located further on the inside in the axial direction than the outside surface in the axial direction of the stationary side support flange is finished so that it is parallel with the outside surface in the axial direction of the stationary side support flange using the outside surface in the axial direction of the stationary side support flange, a flat surface processing is performed on the outside surface in the axial direction of the rotating side support flange using said middle reference side surface section as a reference surface, such that the parallelism of the outside surface in the axial direction of the rotating side support flange with respect to the outside surface in the axial direction of the stationary side support flange is improved.

3. The manufacturing method for a wheel-supporting rolling bearing unit of claim 2, wherein the middle reference side surface section is either an inside surface in the axial direction of the stationary side support flange, or an inside surface in the axial direction of a connection flange that is formed around the outer peripheral surface of the outer race for connecting and fastening the outer race to the suspension.

4. The manufacturing method for a wheel-supporting rolling bearing unit of claim 1, wherein when performing a flat surface processing on the rotating side installation surface using the stationary side installation surface as a reference surface, in a state that the center axis of the stationary side member and rotating side member is oriented in a vertical direction, and the stationary side support flange is supported and secured, a section of the stationary side member that is opposite from the stationary side support flange in a radial direction of the stationary side member is supported by a support member, such that a center axis of the stationary side member and rotating side member is prevented from shifting from the vertical direction due to the weight of both members and the rolling bodies.

5. The manufacturing method for a wheel-supporting rolling bearing unit of claim 4, wherein the flat surface processing is performed on the rotating side installation surfaces while pressing the support member upwards by an elastic force that corresponds to the weight of the stationary side member, rotating side member and rolling bodies.

6. The manufacturing method for a wheel-supporting rolling bearing unit of claim 1, wherein the side installation surface is formed on an outside surface in an axial direction of the rotating side support flange;

a positioning cylindrical section that protrudes outward in the axial direction further than the rotating side installation surface is formed on an end section on an inner radial side of the rotating side installation surface; and with the rotating side member held in order to perform a finishing process on the rotating side installation surface, performs a finishing process on an outer peripheral surface of the positioning cylindrical section so as to make this outer peripheral surface concentric with the rotating side member.

7. A wheel-supporting rolling bearing unit that is manufactured by the manufacturing method of claim 1, comprising:

a stationary side member, a rotating side member, and a plurality of rolling bodies; wherein the stationary side member has a stationary side raceway formed around a stationary side peripheral surface thereof, and a stationary side support flange for fastening to and supporting a caliper or support of a disk brake formed on an outer peripheral surface thereof, and does not rotate in a connected and fastened state to a suspension in use;

the rotating side member has a rotating side raceway formed around a rotating side peripheral surface thereof, and rotates together with a wheel and a disk in use, and a rotating side support flange for fastening to and supporting the wheel and the disk of the disk brake formed around an outer peripheral surface of the rotating side member that comprises a rotating side installation surface for installing the disk in use that is at least part of either one of side surfaces of the rotating side support flange, and that is to be perpendicular with respect to the center axis of rotation of the rotating side member;

the rolling bodies are located between the stationary side raceway and rotating side raceway so that they can roll freely; and wherein at least part of either one of side surfaces of the stationary side support flange functions as a stationary side installation surface for installing the caliper or support in use.

* * * * *